(12) United States Patent
Matsuda

(10) Patent No.: US 7,750,961 B2
(45) Date of Patent: Jul. 6, 2010

(54) SOLID-STATE IMAGING APPARATUS USING AN AMPLIFICATION-TYPE MOS SENSOR

(75) Inventor: Seisuke Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 354 days.

(21) Appl. No.: 11/902,994

(22) Filed: Sep. 27, 2007

(65) Prior Publication Data
US 2008/0079825 A1 Apr. 3, 2008

(30) Foreign Application Priority Data
Sep. 29, 2006 (JP) .............................. 2006-267472

(51) Int. Cl.
H04N 3/14 (2006.01)
H04N 5/335 (2006.01)

(52) U.S. Cl. ..................... 348/308; 348/222.1; 348/241; 348/294; 348/300; 348/302

(58) Field of Classification Search ........................ None
See application file for complete search history.

(56) References Cited

U.S. PATENT DOCUMENTS

| | | | | |
|---|---|---|---|---|
| 2001/0005227 A1* | 6/2001 | Egawa et al. | ................. | 348/304 |
| 2001/0013901 A1* | 8/2001 | Matsunaga et al. | .......... | 348/308 |
| 2001/0033337 A1* | 10/2001 | Sakuragi | ...................... | 348/302 |
| 2001/0040635 A1* | 11/2001 | Fossum et al. | .............. | 348/308 |
| 2005/0285958 A1* | 12/2005 | Matsuda | ...................... | 348/300 |

FOREIGN PATENT DOCUMENTS

| | | |
|---|---|---|
| JP | 09163236 A | 6/1997 |
| JP | 2006014107 A | 1/2006 |

* cited by examiner

Primary Examiner—David L Ometz
Assistant Examiner—Dwight Alex C Tejano
(74) Attorney, Agent, or Firm—Westerman, Hattori, Daniels & Adrian, LLP

(57) ABSTRACT

A solid-state imaging apparatus including: a pixel section having a plurality of pixels two-dimensionally arranged in rows and columns; a vertical scanning section; a noise suppressing section having clamp capacitors each connected at one end thereof to output ends of the pixels and a mixing switch for connecting in parallel a plurality of the clamp capacitors in the row direction, for effecting noise suppression of signal associated with the pixel; a horizontal scanning section for outputting those signals associated with the pixels after the noise suppression; and a mode control section having in a selective manner a first mode where the noise suppressing section is caused to execute the noise suppression with the mixing switch turned OFF, and a second mode where the noise suppressing section is caused to execute the noise suppression with the mixing switch turned ON after a turning OFF of the clamp setting signal.

6 Claims, 8 Drawing Sheets

SOLID-STATE IMAGING APPARATUS USING AN AMPLIFICATION-TYPE MOS SENSOR

This application claims benefit of Japanese Patent Application No. 2006-267472 filed in Japan on Sep. 29, 2006, the contents of which are incorporated by this reference.

BACKGROUND OF THE INVENTION

The present invention relates to solid-state imaging apparatus, and more particularly relates to a solid-state imaging apparatus using an amplification-type MOS sensor.

In recent years, those solid-state imaging apparatus employing an amplification-type MOS sensor as the solid-state imaging apparatus are used as a solid-state imaging apparatus of low power consumption for mobile equipment or are mounted on a high-resolution electronic still camera. While the latest solid-state imaging apparatus using amplification-type MOS sensor generally employ progressive scanning where pixel signals are sequentially read out, it is also an requirement in the above described electronic still camera to rapidly read image signals of a relatively low resolution for example for a small frame to be used in a viewfinder or monitor. For this reason, there has been proposed a processing for reducing the number of image data by mixing a plurality of image signals in a horizontal or vertical direction within the solid-state imaging apparatus.

FIG. 1 is a circuit diagram showing an example of such solid-state imaging apparatus having a means for mixing a plurality of pixel signals in a horizontal direction disclosed for example in Japanese Patent Application Laid-Open 2006-14107. The solid-state imaging apparatus shown in FIG. 1 includes: a pixel section 1 where unit pixels P11 to P44 are two-dimensionally arranged in rows and columns; a vertical scanning circuit 2 for selecting a row to be read out of the pixel section 1; a current supply section 3 for supplying a bias current to the pixel section 1; a noise suppressing section 4 for suppressing noise component contained in output signal of the pixel sectional; a horizontal select switch section 5 for outputting signals suppressed of noise; a horizontal scanning circuit 6 for selecting column to be read through the horizontal select switch section 5; an output line 7; and a mode control section 8, for determining operation timing of the noise suppressing section 4 and horizontal scanning circuit 6. It should be noted that the pixel section 1 in the illustrated example is shown as a portion consisting of 4×4 pixel arrangement.

The unit pixel P11 to P44 includes: a photodiode PD1 serving as photoelectric conversion section; a reset transistor M1 for resetting detection signal of the photodiode PD1; an amplification transistor M2 for amplifying signal of the photodiode PD1; and a row select transistor M3 for selecting the unit pixels of each row.

A row to be read out of the pixel section 1 is then selected by power supply line VR1 to VR4, row reset line φRST1 to φRST4, and row select line φROW1 to φROW4 which are outputs of the vertical scanning circuit 2 so that the pixel signals of the unit pixels P11 to P44 are read out row by row.

At the noise suppressing section 4, a noise suppressing circuit CDS1 to CDS4 consisting of a sampling transistor M21 to M24, clamping transistor M31 to M34, clamping capacitor C31 to C34, and holding capacitor C41 to C44 is provided for each column, and in addition horizontal mixing transistors. M42 and M43 for connecting clamp output lines CL11, CL12, and CL13 are provided.

The drive operation at the time of horizontal mixing in the solid-state imaging apparatus having such construction will now be described by way of a timing chart shown in FIG. 2. A description will be given below with noticing the operation of the pixels of first to third rows from the left side in the case where a first row from the upper side of the pixel section 1 is selected by the vertical scanning circuit 2. At first, drive timing at the time of horizontal mixing operation is set to the noise suppressing section 4 and horizontal scanning circuit 6 by control signal of the mode control section 8.

Subsequently, row select line signal φROW1 is driven to H level to turn ON each row select transistor M3 of the unit pixels P11 to P13 so that signal voltages of each photodiode PD1 contained in unit pixels P11 to P13 are respectively outputted to vertical signal lines V11 to V13 through the amplification transistor M2. At this time, the signal voltages on the vertical signal lines V11 to V13 are respectively supposed as $V_{V11\text{-}SIG}$ to $V_{V13\text{-}SIG}$.

Here, sample control line signal φSH and clamp control line signal φCL are driven to H level at the noise suppressing section 4 so that the sampling transistors M21 to M23 and clamping transistors M31 to M33 are turned ON. The clamp output lines CL11 to CL13 are thereby set to a voltage value $V_{REF}$ of a reference voltage line REF so that difference voltages as shown in the following expressions (1) to (3) are accumulated at the clamping capacitors C31 to C33. It should be noted that, since the horizontal mixing transistors M42 and M43 are being turned ON at this time by driving horizontal mixing control line signal φAV–H to H level, the clamp output lines CL11 to CL13 are connected to one another.

$$\text{Difference voltage accumulated at C31: } V_{V11\text{-}SIG} - V_{REF} \quad (1)$$

$$\text{Difference voltage accumulated at C32: } V_{V12\text{-}SIG} - V_{REF} \quad (2)$$

$$\text{Difference voltage accumulated at C33: } V_{V13\text{-}SIG} - V_{REF} \quad (3)$$

Next, the clamp control line signal φCL is changed to L level to bring the clamp output lines CL11 to CL13 to their high-impedance state. In this condition, then, after driving row reset line signal φRST1 to H level; the signal φRST1 is brought to L level again. The reset voltages of each photodiode PD1 contained in the unit pixels P11 to P13 are thereby respectively outputted to the vertical signal lines V11 to V13 through the amplification transistor M2. At this time, supposing $V_{V11\text{-}RST}$ to $V_{V13\text{-}RST}$ respectively as reset voltages on the vertical signal lines V11 to V13 and $\Delta V_{V11}$ to $\Delta V_{V13}$ respectively as difference voltages between the signal voltages and the reset voltages of the vertical signal lines V11 to V13, the relationships of the following expressions (4) to (8) are obtained by the conservation law of electric charge, since the clamp output lines CL11 to CL13 are in their high-impedance state.

$$\Delta V_{V11} - \Delta V_{CL11} = \Delta Q_{C31}/C31 \quad (4)$$

$$\Delta V_{V12} - \Delta V_{CL12} = \Delta Q_{C32}/C32 \quad (5)$$

$$\Delta V_{V13} - \Delta V_{CL13} = \Delta Q_{C33}/C33 \quad (6)$$

$$\Delta V_{CL11} = \Delta Q/(C41+C42+C43) \quad (7)$$

$$\Delta Q = \Delta Q_{C31} + \Delta Q_{C32} + \Delta Q_{C33} \quad (8)$$

where: $\Delta V_{CL11} (=\Delta V_{CL12}=\Delta V_{CL13})$ is amount of change of the clamp output line voltage $V_{CL11}(=V_{CL12}=V_{CL13})$; $\Delta Q_{C31}$ to $\Delta Q_{C33}$ is amount of change of electric charge at the clamping capacitors C31 to C33; and $\Delta Q$ is a total change amount of electric charge at the holding capacitors C41 to C43.

Further, the following expressions (9), (10) are obtained by rearranging (4) to (8) with supposing that the clamping capacitors C31 to C33 each have the same capacitance value CCL and that the holding capacitors C41 to C43 each have the same capacitance value CSH.

$$\Delta V_{CL11} = [\{CCL/(CCL+CSH)\} \times (\Delta V_{V11} + \Delta V_{C12} + \Delta V_{V13})/3] \quad (9)$$

$$V_{CL11} = V_{REF} + \Delta V_{CL11} \quad (10)$$
$$= V_{REF} + [\{CCL/(CCL+CSH)\} \times (\Delta V_{V11} + \Delta V_{V12} + \Delta V_{V13})/3]$$

Accordingly, even when the thresholds of the amplification transistors M2 contained in the unit pixels P11 to P13 are different from one another due to manufacturing variance, the threshold components are contained in both the signal voltage and the reset voltage.

For this reason, by obtaining a difference voltage between these, it is possible to obtain an output where the threshold variance of amplification transistor M2 is canceled. In addition, at the same time of completion of the noise suppressing operation of pixel signals of the unit pixels P11 to P13, the mixing operation of the pixel signals is also ended.

After that, by bringing the sample control line signal φSH to L level to turn OFF the sampling transistors M21 to M23, the pixel section 1 and the noise suppressing section 4 are disconnected from each other. Further, the horizontal mixing control line signal φAV-H is brought to L level to turn OFF the horizontal mixing transistors M42 and M43, thereby respectively disconnecting the clamp output lines CL11 to CL13 which have been connected to one another. Subsequently, the row select line signal φROW1 is changed to L level to respectively disconnect the connection between the unit pixels P11 to P13 and the vertical signal lines V11 to V13.

Signal are read from the noise suppressing section. 4 to the output line 7 as follows. First, the reset control line signal φRS is driven to H level to turn ON an output resetting transistor M111 so as to set the output line 7 to the voltage value $V_{HREF}$ of an output reference voltage line HREF, and the reset control line signal φRS is then switched to L level again to effect a reset operation of the output line. Subsequently, signals are read out from the noise suppressing section 4 to the output line 7 through the horizontal select switch section 5 which is selected by the horizontal scanning circuit 6. Here, by outputting horizontal select pulses φH1, φH4 from the horizontal scanning circuit 6, the horizontal select switch section 5 is operated with skipping two columns so as to read the mixed signals out to the output line 7 only from: the holding capacitors C41 and C44. The number of image data thereby becomes ⅓.

FIG. 3 shows an example of read method of OB pixels in a solid-state imaging apparatus capable of effecting thinned-out read disclosed for example in Japanese Patent Application Laid-Open hei-9-163236. In this method as shown in FIG. 3, all pixel signals are read out from the horizontal OB pixel region even at the time of subsampled read in order to achieve an optimum OB clamp operation to effect stable imaging against changes in ambient environment such as temperature. By then obtaining an average value of these OB pixel signals in the horizontal direction, an optimum OB clamp operation is effected.

SUMMARY OF THE INVENTION

In a first aspect of the invention, there is provided a solid-state imaging apparatus including: a pixel section having a plurality of pixels two-dimensionally arranged in rows and columns, each containing a photoelectric conversion section and an amplification section for amplifying and outputting as pixel signal an output of the photoelectric conversion section; a vertical scanning section for selecting a row to be read out of the pixel section; a noise suppressing section having clamp capacitors each connected at one end thereof to output ends of the pixels by the unit of the column of the pixel section and a mixing switch for mixing signals of a plurality of pixels in the row direction by connecting the other ends of adjacent ones of the clamp capacitors, setting as a reference level a signal level of the pixel retained: at the clamp capacitor at a first timing when a clamp setting signal for setting a clamp potential is being applied to the other end of the clamp capacitor, for obtaining an output signal corresponding to a difference level therefrom of a signal level associated with the pixel at a second timing so as to effect noise suppression of signal associated with the pixel; a horizontal scanning section for sequentially selecting by the unit of the column those signals associated with the pixels after the noise suppression and outputting them from a horizontal signal line; and a mode control section having in a selective manner a first mode where the noise suppressing section is caused to execute the noise suppression with the mixing switch turned OFF, and a second mode where the noise suppressing section is caused to execute the noise suppression with the mixing switch turned ON after a turning OFF of the clamp setting signal.

In a second aspect of the invention, the noise suppressing section in the solid-state imaging apparatus according to the first aspect further includes an amplification section for outputting an inversion amplification signal or a non-inversion amplification signal of the output signal corresponding to the difference level.

In a third aspect of the invention, the mixing switch in the solid-state imaging apparatus according to the first, or second aspect is formed of MOS transistor where drain configuration and source configuration are set in accordance with a number and location of the connected ones of the clamp capacitors so that width of the gate thereof connected to each one of the clamp capacitors is substantially the same between each of the clamp capacitors.

In a fourth aspect of the invention, the mixing switch in the solid-state imaging apparatus according to the first or second aspect is formed in units each with an even number of first MOS transistors of the same configuration connected in parallel to one another disposed between the other ends of adjacent ones of the clamp capacitors, and has second MOS transistors functioning as switch of a number half the number of the first MOS transistors, having the same configuration as the first MOS transistor with the source and drain thereof being connected to the other ends of the clamp capacitors that are located at both ends in an arrangement of the clamp capacitors to be mixed.

In a fifth aspect of the invention, there is provided a solid-state imaging apparatus including: a pixel section having a plurality of pixels two-dimensionally arranged in rows and columns, each containing a photoelectric conversion section and an amplification section for amplifying and outputting as pixel signal an output of the photoelectric conversion section; a vertical scanning section for selecting a row to be read out of the pixel section; a noise suppressing section having clamp capacitors each connected at one end thereof to output ends of the pixels by the unit of the column of the pixel section and a mixing switch for mixing signals of a plurality of pixels in the row direction by connecting the other ends of adjacent ones of the clamp capacitors, setting as a reference level a signal level of the pixel retained at the clamp capacitor at a first timing when a clamp setting signal for setting a clamp potential is being applied to the other end of the clamp capacitor, for obtaining an output signal corresponding to a difference level therefrom of a signal level associated with the pixel at a second timing so as to effect noise suppression of signal associated with the pixel; a horizontal scanning section for sequentially selecting by the unit of the column those signals associated with the pixels after the noise suppression and outputting them from a horizontal signal line; and a mode control section having in a selective manner a first mode where the noise suppressing section is caused to execute the noise suppression with the mixing switch turned OFF, and a second mode where, the noise suppressing section is caused to execute the noise suppression with the mixing switch turned ON; wherein the mixing switch is formed of MOS transistors where drain configuration and source configuration are set in accordance with a number and location of the connected ones of the clamp capacitors so that width of the gate thereof connected to each one of the clamp capacitors is substantially the same between each of the clamp capacitors.

In a sixth aspect of the invention, there is provided a solid-state imaging apparatus including: a pixel section having a plurality of pixels two-dimensionally arranged in rows and columns, each containing a photoelectric conversion section and an amplification section for amplifying and outputting as pixel signal an output of the photoelectric conversion section; a vertical scanning section for selecting a row to be read out of the pixel section; a noise suppressing section having clamp capacitors each connected at one end thereof to output ends of the pixels by the unit of the column of the pixel section and a mixing switch for mixing signals of a plurality of pixels in the row direction by connecting the other ends of adjacent ones of the clamp capacitors, setting as a reference level a signal level of the pixel retained at the clamp capacitor at a first timing when a clamp setting signal for setting a clamp potential is being applied to the other end of the clamp capacitor, for obtaining an output signal corresponding to a difference level therefrom of a signal level associated with the pixel at a second timing so as to effect noise suppression of signal associated with the pixel; a horizontal scanning section for sequentially selecting by the unit of the column those signals associated with the pixels after the noise suppression and outputting them from a horizontal signal line; and a mode control section having in a selective manner a first mode where the noise suppressing section is caused to execute the noise suppression with the mixing switch turned OFF, and a second mode where the noise suppressing section is caused to execute the noise suppression with the mixing switch turned ON; wherein the mixing switch is formed in units each with an even number of first MOS transistors of the same configuration connected in parallel to one another disposed between the other ends of adjacent ones of the clamp capacitors, and has second MOS transistors functioning as switch of a number half the number of the first MOS transistors, having the same configuration as the first MOS transistor with the source and drain thereof being connected to the other ends of the clamp capacitors that are located at both ends in an arrangement of the clamp capacitors to be mixed.

DESCRIPTION OF THE PREFERRED EMBODIMENTS

Some embodiments of the solid-state imaging apparatus according to the invention will be described below with reference to the drawings.

Embodiment 1

Figure 1:
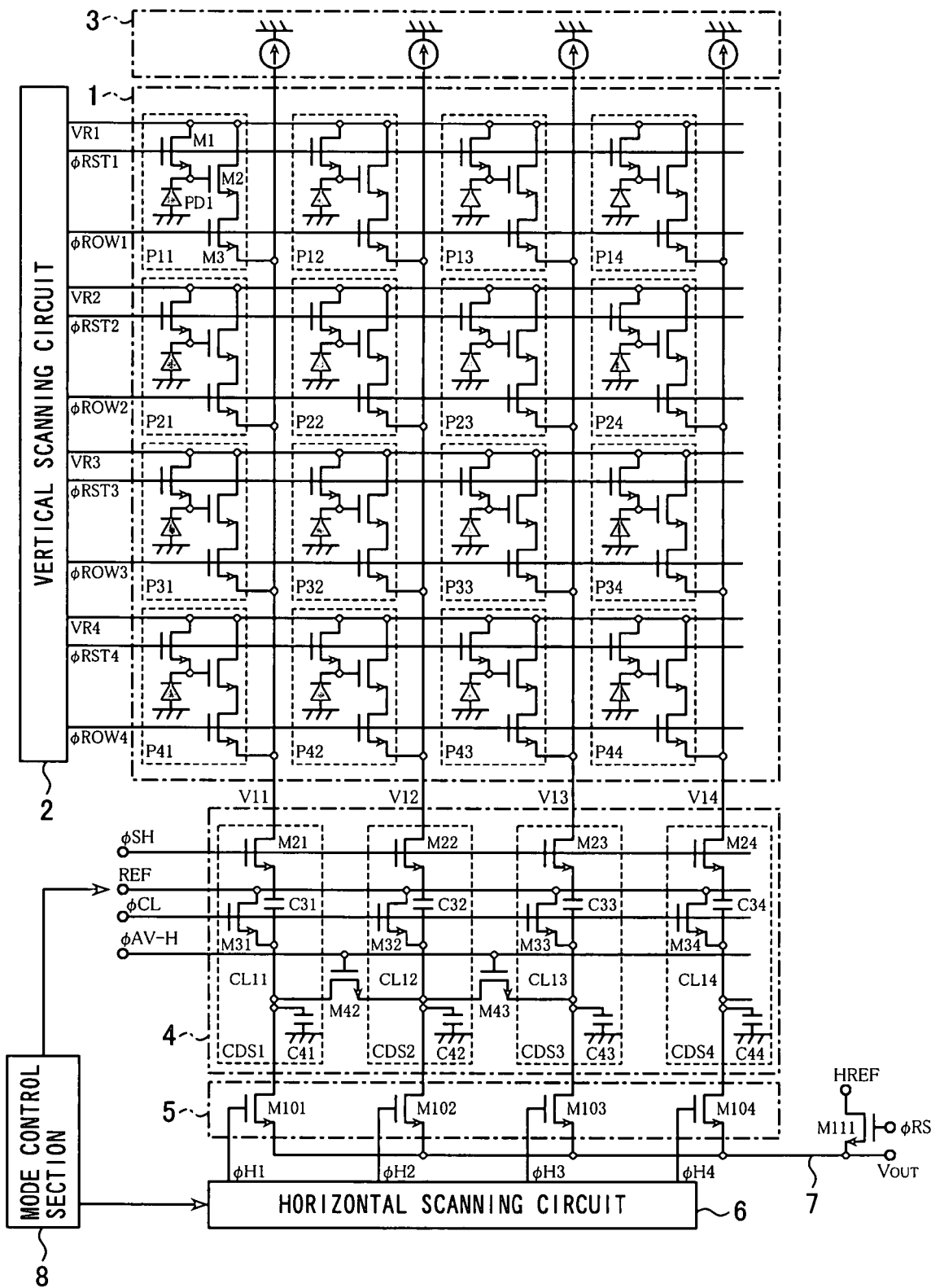
FIG. 1 is a circuit diagram showing an example of construction of a prior art solid-state imaging apparatus having a means for mixing pixel signals in the horizontal direction.
Figure 4:
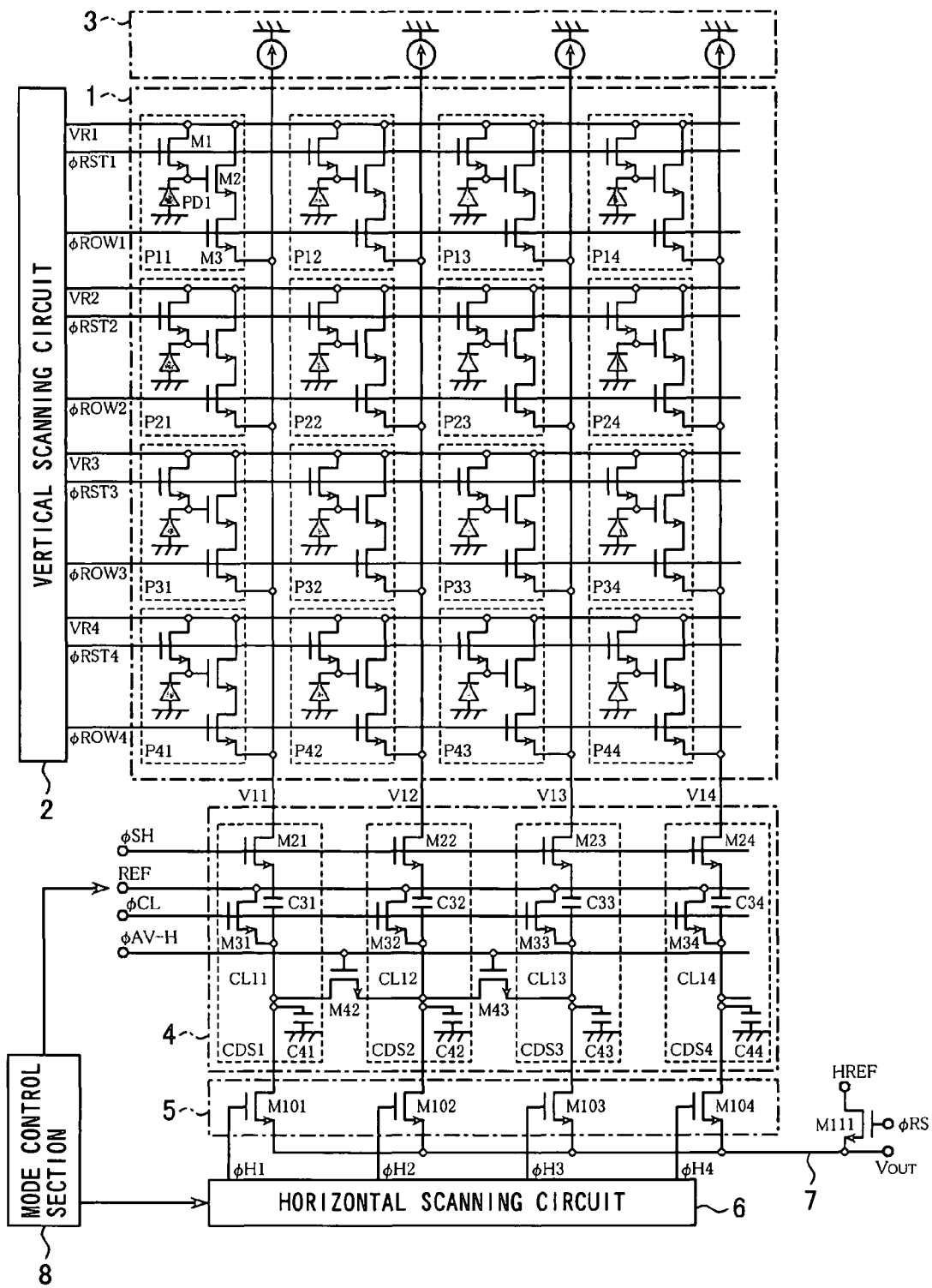
FIG. 4 is a circuit diagram showing construction of a first embodiment of the solid-state imaging apparatus according to the invention.
Figure 5:
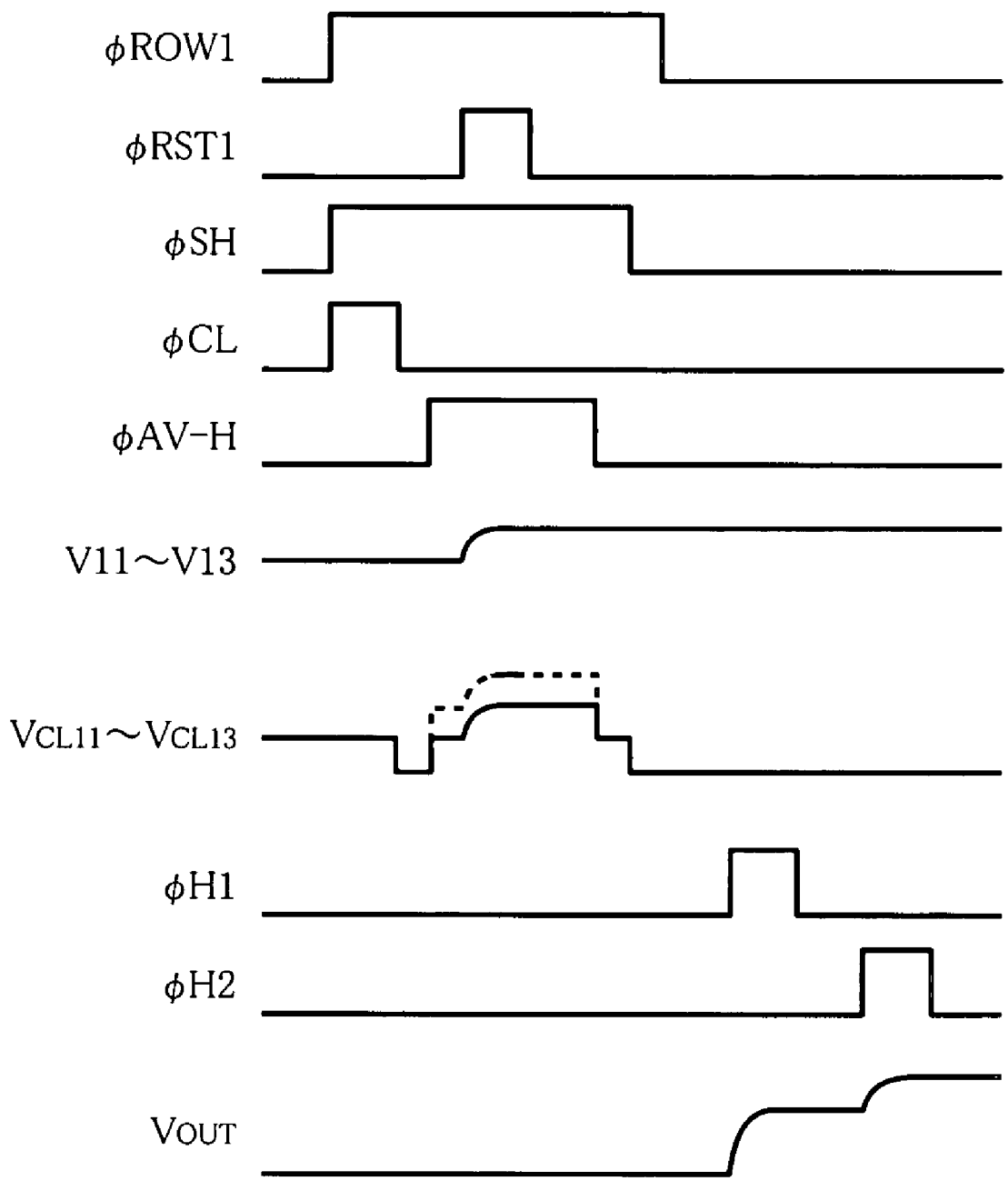
FIG. 5 is a timing chart for explaining operation of the solid-state imaging apparatus according to the first embodiment shown in FIG. 4.

A first embodiment will now be described of the solid-state imaging apparatus according to the invention using an amplification type MOS sensor. The solid-state imaging apparatus according to this embodiment is capable of selecting from a first mode where pixel signals associated with each individual pixel are outputted from an output terminal $V_{OUT}$, and a second mode, where pixel signals associated with a plurality of pixels are mixed in a horizontal direction so as to be outputted from the output terminal $V_{OUT}$. The control of selection concerning the first and second modes is effected by a mode control section 8. The mode of drive concerning this point is similar also in the other embodiments. FIG. 4 is a circuit diagram showing construction of the solid-state imaging apparatus according to the first embodiment. The construction itself is identical to the prior art example shown in FIG. 1 and will not be described. FIG. 5 is a timing chart generally showing drive operation of each section at the time of a horizontal mixing operation which is the second mode concerning the present embodiment. It should be noted that the drive timing of the first mode is similar to the drive timing of the second mode with an exception that a horizontal mixing control line signal φAV–H is always set to L level. A description will be given below with noticing the operation of the pixels of first to third columns from the left side in the case where a first row from the upper side of the pixel section 1 is selected by the vertical scanning circuit 2.

At first, drive timing in the second mode is set to the noise suppressing section 4 and horizontal scanning circuit 6 by control signal of the mode control section 8. Subsequently, row select line signal φROW1 is driven to H level to turn ON each row select transistor M3 of the unit pixels P11 to P13.

The signal voltages of each photodiode PD1 contained in unit pixels P11 to P13 are thereby respectively outputted to vertical signal lines V11 to V13 through the amplification transistor M2. At this time, the signal voltages on the vertical signal lines V11 to V13 are respectively supposed as $V_{V11\text{-}SIG}$ to $V_{V13\text{-}SIG}$.

Here, sample control line signal φSH and clamp control line signal φCL are driven to H level at the noise suppressing section 4 so that the sampling transistors M21 to M23 and clamping transistors M31 to M33 are turned ON. The clamp output lines CL11 to CL13 are thereby set to a voltage value $V_{REF}$ of a reference voltage line REF so that difference voltages as shown in the following expressions (11) to (13) are accumulated at the clamping capacitors C31 to C33.

Difference voltage accumulated at C31: $V_{V11\text{-}SIG} - V_{REF}$ (11)

Difference voltage accumulated at C32: $V_{V12\text{-}SIG} - V_{REF}$ (12)

Difference voltage accumulated at C33: $V_{V13\text{-}SIG} - V_{REF}$ (13)

Next; the clamp control line signal φCL is changed to L level to bring each clamp output line CL11 to CL13 to their high-impedance state. Subsequently, the horizontal mixing control line signal φAV-H is driven to H level to turn ON the horizontal mixing transistors M42 and M43 so as to connect the clamp output lines CL11 to C13 to one another. At this time, a feedthrough component VFT(φCL) of the clamping transistor M31 to M33 occurs when the clamp control line signal φCL changes to L level, and a feedthrough component VFT(φAV-H=H) by the horizontal mixing transistors M42 and M43 occurs when the horizontal mixing control line signal φAV-H changes to H level. The changes in potential ΔVFT(C41) to ΔVFT(C43) of the holding capacitors C41 to C43 by the various feedthrough components are shown in the following expressions (14), (15).

$$\Delta VFT(C41) = \Delta VFT(C43) = VFT(\phi CL) - VFT(\phi AV\text{-}H=H) \quad (14)$$

$$\Delta VFT(C42) = \Delta VFT(\phi CL) - \{2 \times VFT(\phi AV\text{-}H=H)\} \quad (15)$$

In this condition, by driving row reset line signal φRST1 to H level and then returning it to L level again, the reset voltages of each photodiode PD1 contained in the unit pixels P11 to P13 are respectively outputted to the vertical signal lines V11 to V13 through the amplification transistor M2. At this time, supposing $V_{v11\text{-}RST}$ to $V_{V13\text{-}RST}$ as reset voltages on the vertical signal lines V11 to V13 and $\Delta V_{V11}$ to $\Delta V_{V13}$ as difference voltages between the signal voltages and the reset voltages of the vertical signal lines V11 to V13, the relationships of the following expressions (16), (17) are obtained by the conservation law of electric charge, since the clamp output lines CL11 to CL13 are in their high-impedance state.

$$\Delta V_{CL11} = [\{CCL/(CCL+CSH)\} \times (\Delta V_{V11} + \Delta V_{V12} + \Delta V_{V13})/3] \quad (16)$$

$$V_{CL11} = V_{REF} + \Delta V_{CL11} \quad (17)$$
$$= V_{REF} + [\{CCL/(CCL+CSH)\} \times (\Delta V_{V11} + \Delta V_{V12} + \Delta V_{V13})/3]$$

where: $\Delta V_{CL11}(=\Delta V_{CL12}=\Delta V_{CL13})$ is amount of change of the clamp output line voltage $V_{CL11}(=V_{CL12}=V_{CL13})$; $\Delta Q_{C31}$ to $\Delta Q_{c33}$ is amount of change of electric charge at the clamping capacitors C31 to C33; ΔQ is a total change amount of electric charge at the holding capacitors C41 to C43; and the clamping capacitors C31 to C33 each have the same capacitance value CCL, while the holding capacitors C41 to C43 each have the same capacitance value CSH.

Accordingly, since threshold components are contained in both the signal voltage and the reset voltage even when the thresholds of the amplification transistors M2 contained in the unit pixels P11 to P13 are different from one another due to manufacturing variance, it is, possible by obtaining a difference voltage between these to attain an output where the threshold variance of amplification transistor M2 is canceled. In addition, at the same time of completion of the noise suppressing operation of the pixel signals of the unit pixels P11 to P12, the mixing operation of the pixel signals is also ended. After that, the horizontal mixing control line signal φAV-H is brought to L level to turn OFF the horizontal mixing transistors M42 and M43, thereby the clamp output lines CL11 to CL13 are disconnected from one another. Subsequently, by bringing the sample control line signal φSH to L level to turn OFF the sampling transistors M21 to M23, the pixel section 1 and the noise suppressing section 4 are disconnected from each other. Further, the row select line signal φROW1 is changed to L level to respectively disconnect the connection between the unit pixels P11 to P13 and the vertical signal lines V11 to V13.

At this time, a feedthrough component VFT(φSH) by the sampling transistor M21 to M23 occurs when the sample control line signal φSH is changed to L level, and a feedthrough component VFT(φAV-H=L) by the horizontal mixing transistors M42 and M43 occurs when the horizontal mixing, control line signal φAV-H changes to L level. By adding the above various feedthrough components to (15) and (16), changes in potential ΔVFT(C41) to ΔVFT(C43) of the holding capacitors C41 to C43 are represented as in the following expressions (18), (19).

$$\Delta VFT(C41) = \Delta VFT(C43) \quad (18)$$
$$= VFT(\phi CL) - VFT(\phi AV\text{-}H = H) +$$
$$VFT(\phi SH) + VFT(\phi AV\text{-}H = L)$$

$$\Delta VFT(C42) = VFT(\phi CL) - \{2 \times VFT(\phi AV\text{-}H = H)\} + \quad (19)$$
$$VFT(\phi SH) + \{2 \times VFT(\phi AV\text{-}H = L)\}$$

Here, since, the feedthrough component VFT(φAV-H=H) by the horizontal mixing transistors M42 and M43 occurring when the horizontal mixing control line signal φAV-H changes to H level, and the feedthrough component VFT (φAV-H=L) by the horizontal mixing transistors M42 and M43 occurring when the horizontal mixing control line signal φAV-H changes to L level are of the same value, the feedthrough components by the horizontal mixing control line signal φAV-H are canceled by each other. Accordingly, potential changes ΔVFT(C41) to ΔVFT(C43) due to the various feedthrough components occurring at the holding capacitors C41 to C43 all become the same as shown in the following expression (20).

$$\Delta VFT(C41) = \Delta VFT(C43) = \Delta VFT(C42) = VFT(\phi CL) + VFT(\phi SH) \quad (20)$$

The signals are read out from the noise suppressing section 4 to the output line 7 as follows. In particular, the reset control line signal φRS is first driven to H level to turn ON an output resetting transistor M111 so as to set the output line 7 to the voltage value $V_{HREF}$ of an output reference voltage line HREF. Next, after effecting an output line reset operation for switching the reset control line signal φRS to L level again, signals are read out to the output line 7 through the horizontal select switch section 5 which is selected by the horizontal scanning circuit 6. Specifically for the OB pixel region, mixed signals are read out to the output line 7 with sequentially operating the horizontal select switch section 5 by the horizontal scanning circuit 6 so as to effect an optimum OB clamp operation. For the effective pixel region, on the other hand, the horizontal select switch section 5 is operated with skipping two columns so as to read the mixed signals to the output line 7 only from the holding capacitors C41 and C44. The number of image data of the effective pixel region thereby becomes ⅓.

According to the present embodiment as the above, at the time of the noise suppressing operation in the second mode, after changing the clamp control line signal φCL to L level, the horizontal mixing control line signal φAV–H is driven to H level to respectively connect the clamp output lines CL11 and CL12, and CL12 and CL13. By then bringing the horizontal mixing control line signal φAV–H to L level before reading signal out to the output line 7 from the noise suppressing section 4, the feedthrough components by the horizontal mixing control line signal φAV–H are canceled each other. The potential changes ΔVFT(C41) to ΔVFT(C43) due to the various feedthrough components occurring at the holding capacitors C41 to C43 all thereby become the same. Accordingly, even when an average value of all OB pixel signals in the horizontal direction is used in the second mode, an optimum OB clamp operation can be achieved.

Embodiment 2

Figure 6:
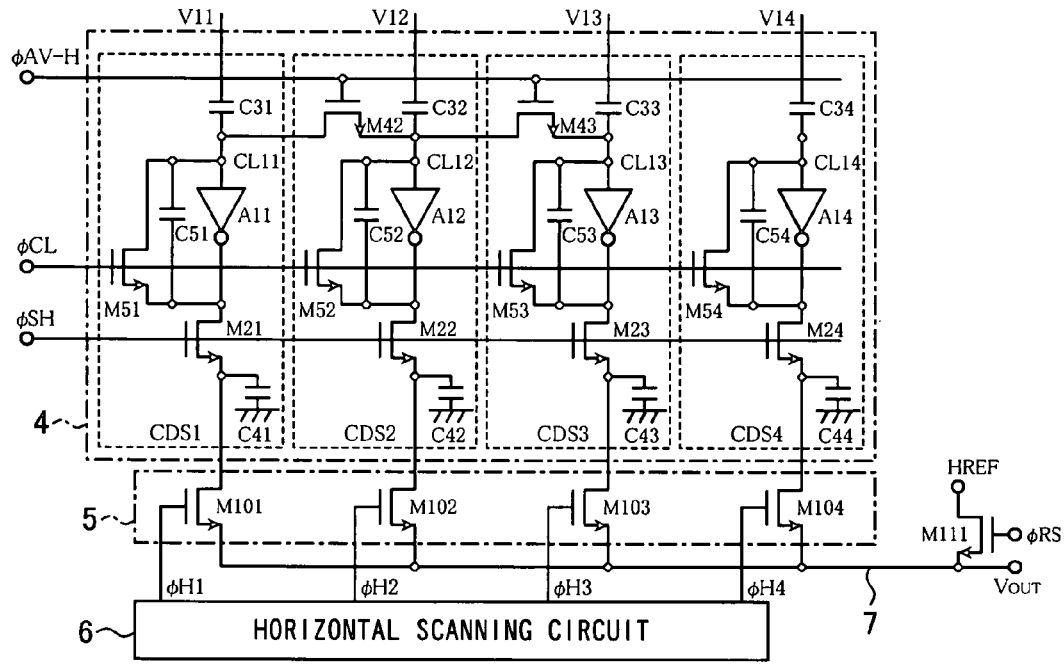
FIG. 6 is a circuit diagram showing construction of a noise suppressing section which is a main portion of the solid-state imaging apparatus according to a second embodiment.

A second embodiment of the solid-state imaging apparatus using amplification type MOS sensor according to the invention will now be described with reference to a main portion thereof shown in FIG. 6. The construction of the second embodiment includes an amplification circuit at the noise suppressing section 4 in the first embodiment shown in FIG. 4, and the construction of the rest is identical to the first embodiment shown in FIG. 4. In particular, as shown in FIG. 6, the noise suppressing section 4 of this embodiment at each column is provided with noise suppressing circuits CDS1 to CDS4 consisting of a sampling transistor M21 to M24, clamping transistor M51 to M54, clamping capacitor C31 to C34, holding capacitor C41 to C44, feedback capacitor C51 to C54, and inverting amplifier A11 to A14. Further, the noise suppressing section 4 includes horizontal mixing transistors M42 and M43 for respectively connecting between the clamp output lines CL11 and CL12, and between CL12 and CL13. Also in this case, the construction is shown of the portion up to the vertical signal line of the fourth column.

An operation of the second embodiment having the above construction will now be described. In the second mode, one identical to that shown in FIG. 5 can be used as a drive timing chart concerning the noise suppressing section 4 shown in FIG. 6. It should be noted that the drive timing of the first mode is similar to the drive timing of the second mode with an exception that a horizontal mixing control line signal φAV–H is always set to L level. Also in this case, a description will be given with noticing the operation of the pixels of first to third columns from the left side in the case where a first row from the upper side of the pixel section is selected by the vertical scanning circuit 2. At first, drive timing in the second mode is set to the noise suppressing section 4 and horizontal scanning circuit 6 by control signal of the mode control section 8.

At the time of noise suppression of the unit pixels P11 to P13, the horizontal mixing control line signal φAV–H is driven to H level after changing the clamp control line signal φCL to L level. The horizontal mixing transistors M42 and M43 are thereby turned ON to connect the clamp output lines CL11 to CL13 to one another so as to simultaneously effect the noise suppressing operation and the horizontal mixing operation of pixel signals. Supposing that the clamping capacitors C31 to C33 each have the same capacitance value CCL and that the feedback capacitors C51 to C53 each have the same capacitance value CF, an inverting amplification circuit where gain is (–CCL/CF) is formed with using the clamping capacitor C31, feedback capacitor C51, and inverting amplifier A11. Here, from the conservation law of electric charge, the clamp output line voltage $V_{CL11}(=V_{CL12}=V_{CL13})$ after the noise suppressing operation is obtained by the following expression (21).

$$V_{CL11} = V_{SHORT} + \{(\Delta V_{V11} + \Delta V_{V12} + \Delta V_{V13})/3\} \times (-CCL/CF) \quad (21)$$

Here, $V_{SHORT}$ is an output voltage of the inverting amplifier A11 when the clamping transistor M51 is turned ON by driving the clamp control line signal φCL to H level to thereby short-circuit between the input terminal and the output terminal of the inverting amplifier A11. Further, changes in potential ΔVFT(C41) to ΔVFT(C43) of the holding capacitors C41 to C43 by the various feedthrough components respectively resulting from change of the clamp control line signal φCL to L level, sampling control line signal φSH to L level, horizontal mixing control line signal φAV–H to H level, and horizontal mixing control line signal φAV–H to L level all become the same as shown in the following expression (22).

$$\Delta VFT(C41) = \Delta VFT(C42) \quad (22)$$
$$= \Delta VFT(C43)$$
$$= VFT(\phi CL) \times (-CCL/CF) + VFT(\phi SH)$$

Figure 7:
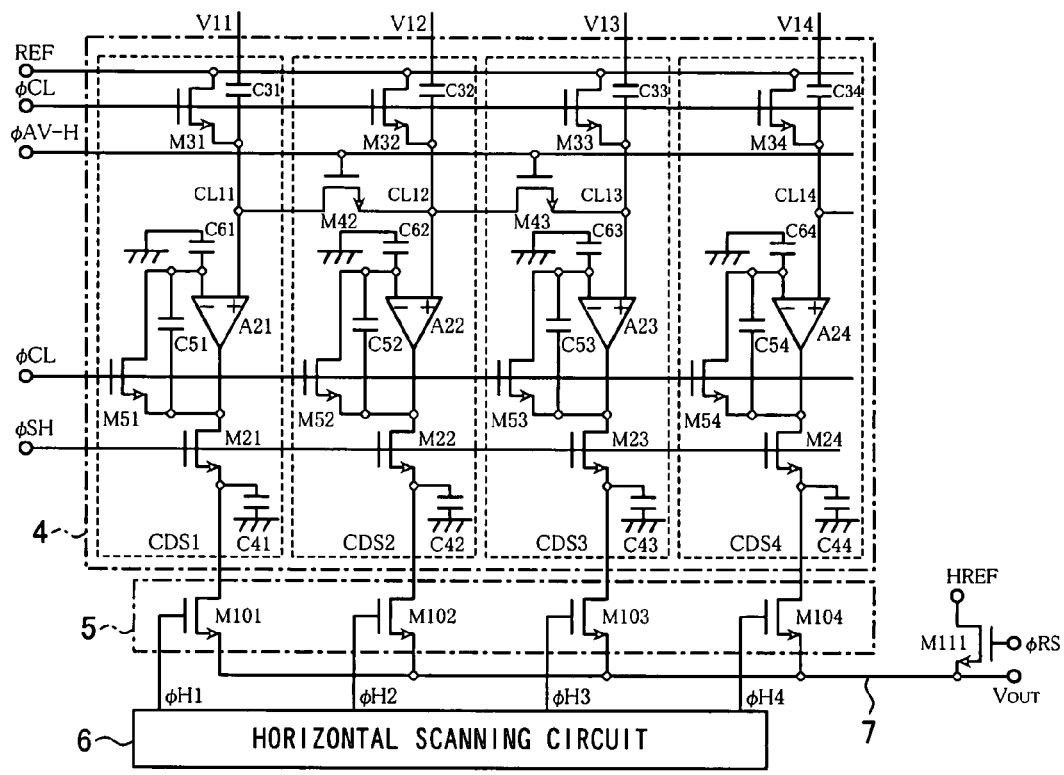
FIG. 7 is a circuit diagram showing a modification of the noise suppressing section according to the second embodiment shown in FIG. 6.

The form of the amplification circuit included in the noise suppressing section 4 is not limited to an inverting amplification circuit, and a non-inverting amplification circuit as shown in a modification in FIG. 7 may also be used. The noise suppressing section 4 shown in FIG. 7 is provided respectively at each column with noise suppressing circuits CDS1 to CDS4 consisting of a sampling transistor M21 to M24, clamping transistor M51 to M54, clamping capacitor C31 to C34, holding capacitor C41 to C44, feedback capacitor C51 to C54, gain setting capacitor C61 to C64, and differential amplifier A21 to A24. Further, the noise suppressing section 4 includes horizontal mixing transistors M42 and M43 for respectively connecting between the clamp output lines CL11 and CL12, and between CL12 and CL13.

An operation of the modification of the second embodiment constructed as the above will now be described. In the second mode, one identical to that shown in FIG. 5 can be used as a drive timing chart concerning the noise suppressing section 4 according to the modification shown in FIG. 7. It should be noted that the drive timing of the first mode is similar to the drive timing of the second mode with an exception that a horizontal mixing control line signal φAV–H is always set to L level. Also in this case, a description will be given with noticing the operation of the pixels of first to third columns from the left side in the case where a first row from the upper side of the pixel section is selected by the vertical scanning circuit 2. At first, drive timing in the second mode is set to the noise suppressing section 4 and horizontal scanning circuit 6 by control signal of the mode control section 8.

At the time of noise suppression of the unit pixels P11 to P13, the horizontal mixing control line signal φAV–H is driven to H level after changing the clamp control line signal φCL to L level. The horizontal mixing transistors M42 and M43 are thereby turned ON to connect the clamp output lines CL11 to CL13 to one another so as to simultaneously effect the noise suppressing operation and the horizontal mixing operation of pixel signals. Supposing that the clamping capacitors C31 to C33 each have the same capacitance value CCL, the feedback capacitors C51 to C53 the same capacitance value CF, and the gain setting capacitors C61 to C63 the same capacitance value CIN, a non-inverting amplification circuit where gain is [1+(CIN/CF)] is formed with using the feedback capacitance CF, gain setting capacitance CIN and differential amplifier A21 (A22, A23). Here, from the conservation law of electric charge, the clamp output line voltage $V_{CL11}(=V_{CL12}=V_{CL13})$ after the noise suppressing operation is obtained by the following expression (23).

$$V_{CL11} = V_{SHORT} + \{(\Delta V_{V11} + \Delta V_{V12} + \Delta V_{V13})/3\} \times \{1 + (CCL/CF)\} \quad (23)$$

where $V_{SHORT}$ is an output voltage of the differential amplifier A21 when the clamping transistor M51 is turned ON by driving the clamp control line signal φCL to H level to short-circuit between the input terminal and the output terminal of the differential amplifier A21.

Further, changes in potential ΔVFT(C41) to ΔVFT(C43) of the holding capacitors C41 to C43 by the various feedthrough components resulting from change of the clamp control line signal φCL to L level, sampling control line signal φSH to L level, horizontal mixing control line signal φAV–H to H level, and horizontal mixing control line signal φAV–H to L level all become the same as shown in the following expression (24).

$$\Delta VFT(C41) = \Delta VFT(C42) \quad (24)$$
$$= \Delta VFT(C43)$$
$$= VFT(\phi CL) \times \{1 + (CCL/CF)\} + VFT(\phi SH)$$

According to the second embodiment and its modification as the above, at the time of the noise suppressing operation in the second mode, after changing the clamp control line signal φCL to L level, the horizontal mixing control line signal φAV–H is driven to H level to respectively connect the clamp output lines CL11 and CL12, and CL12 and CL13. By bringing the horizontal mixing control line signal φAV–H to L level before reading signal out to the output line 7 from the noise suppressing section 4, the feedthrough components by the horizontal mixing control line signal φAV–H are canceled each other. The potential changes ΔVFT(C41) to ΔVFT(C43) due to the various feedthrough components occurring at the holding capacitors C41 to C43 all thereby become the same.

Accordingly, even when an average value of all OB pixel signals in the horizontal direction is used in the second mode, an optimum OB clamp operation can be achieved.

Further, since signals are amplified at the noise suppressing circuit, the effect of noise occurring after the noise suppressing circuit can be suppressed so as to improve S/N.

Embodiment 3

Figure 8:
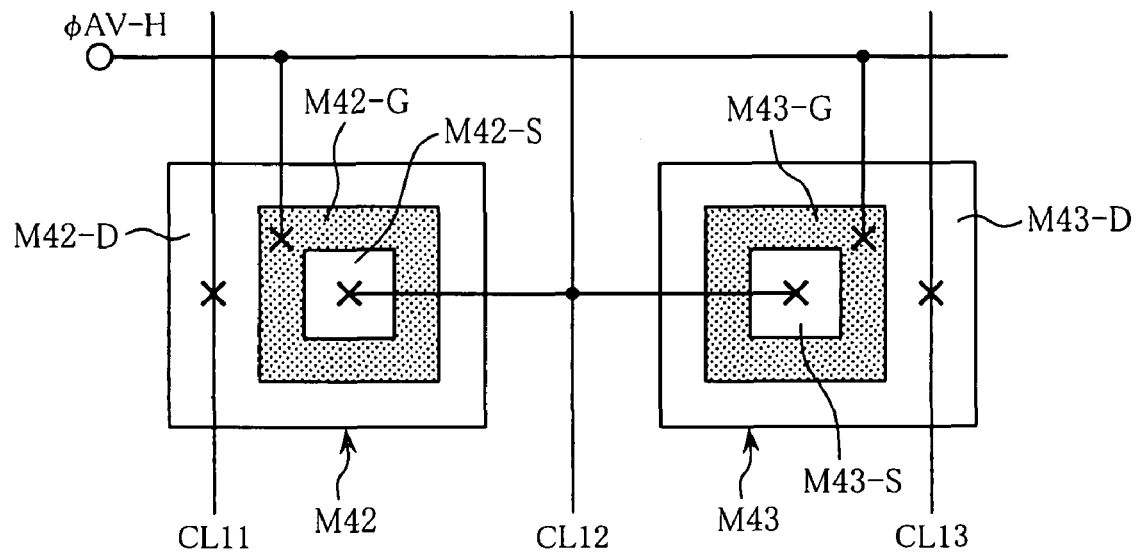
FIG. 8 is a general top view showing construction of a horizontal mixing transistor in a noise suppressing section of the solid-state imaging apparatus according to a third embodiment.

A third embodiment of the invention winnow be described. This embodiment is to specify the configuration of the horizontal mixing transistor M42 and M43 contained in the noise suppressing section 4 in the first embodiment shown in FIG. 4. FIG. 8 schematically shows the configuration of the horizontal mixing transistors M42 and M43 of the noise suppressing section in the third embodiment. As shown in FIG. 8, the gate electrode M42-G, M43-G of the horizontal mixing transistors M42 and M43 is ring-shaped, and the inside of the gate electrode M42-G, M43-G is made as source region M42-S, M43-S, and the outside of the gate electrode M42-G, M43-G as drain region M42-D, M43-D. Further, the peripheral length of the gate electrode M42-G, M43-G that is in contact with the drain region M42-D, M43-D is made to be two times the peripheral length of the gate electrode M42-G, M43-G that is in contact with the source region M42-S, M43-S. Here, supposing the between gate-source capacitance of the horizontal mixing transistor M42, M43 as Cov, the between gate-drain capacitance thereof becomes 2×Cov.

Figure 9:
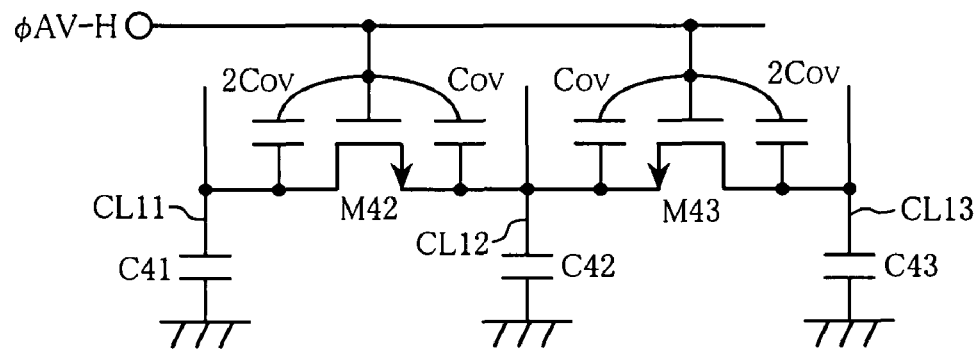
FIG. 9 shows a circuit construction of the connecting portion of holding capacitor of the noise suppressing section of the third embodiment shown in FIG. 8.

The connecting portions of the holding capacitors C41 to C43 are then obtained as equivalent circuit shown in FIG. 9, when the drain of: the horizontal mixing transistor M42 is connected to the holding capacitor C41, the respective source of the horizontal mixing transistors M42 and M43 to the holding capacitor C42, and drain of the horizontal mixing transistor M43 to the holding capacitor C43.

As shown in FIG. 9, a capacity component of 2×Cov is equally added to the holding capacitors C41 to C43. Supposing VFT(φAV–H) as the feedthrough component of the gate-source capacitance Cov of the horizontal mixing transistor M42 produced by the horizontal mixing control line signal φAV–H, changes in potential ΔVFT(C41) to ΔVFT(C43) occurring at the holding capacitors C41, to C43 by the feedthrough component VFT(φAV–H) due to the horizontal mixing control line signal fAV–H all become the same as shown in the following expression (25).

$$\Delta VFT(C41)=\Delta VFT(C43)=\Delta VFT(C42)=2 \times VFT(\phi AV-H) \quad (25)$$

Figure 2:
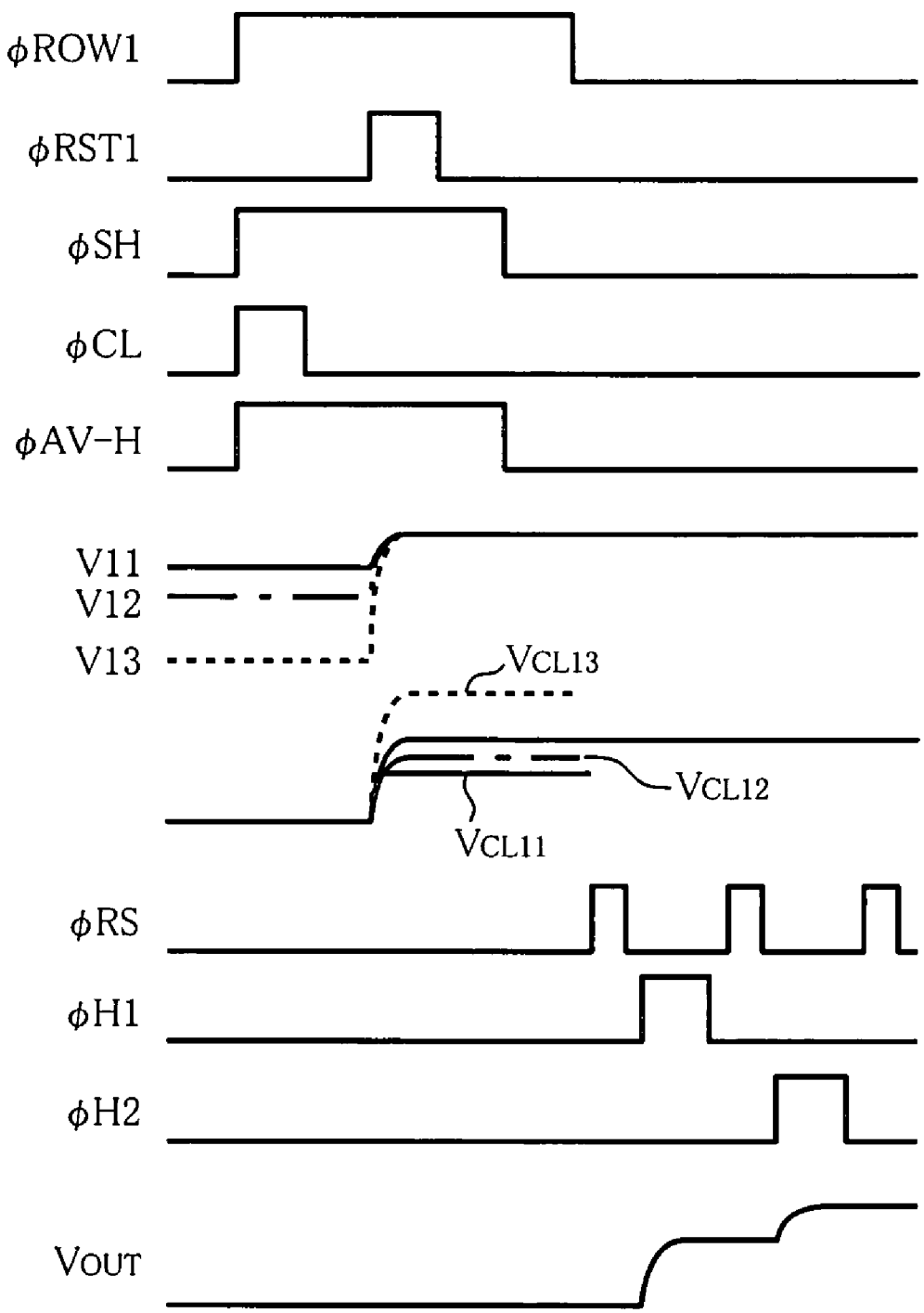
FIG. 2 is a timing chart for explaining operation of the prior-art solid-state imaging apparatus shown in FIG. 1.
Figure 3:
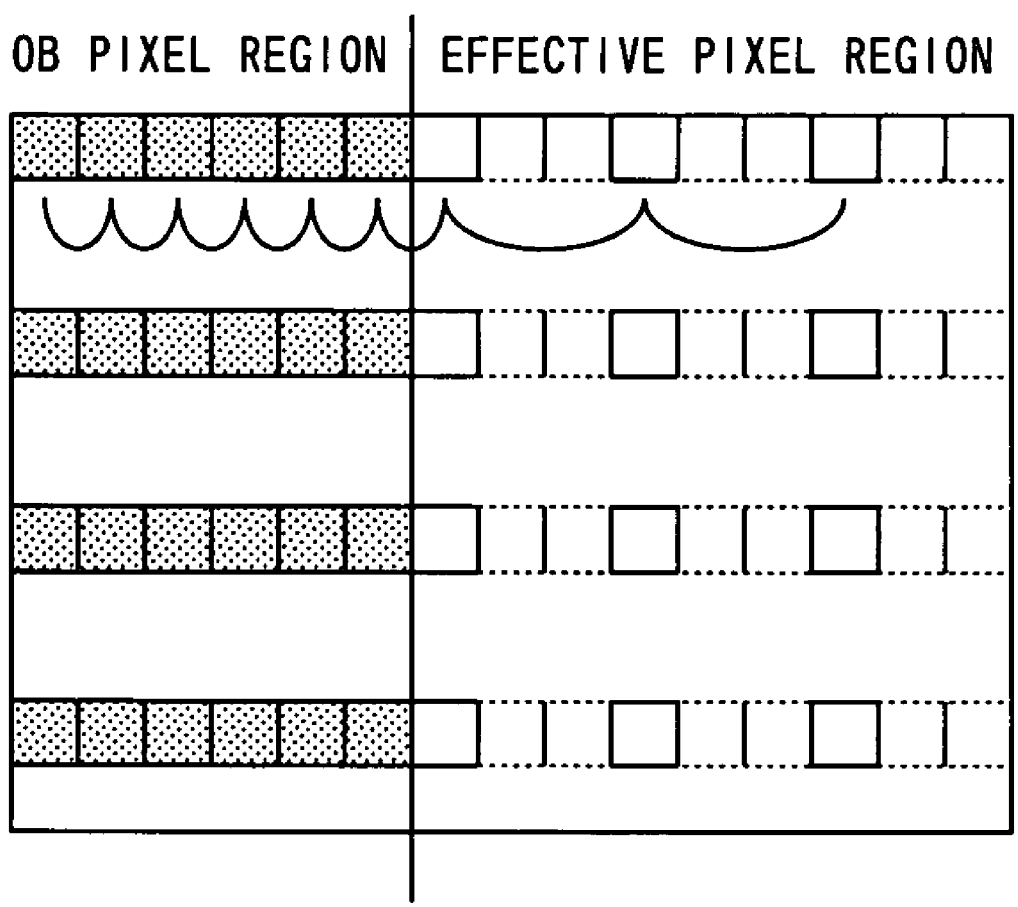
FIG. 3 is an explanatory drawing for explaining a read method of OB pixels in a solid-state imaging apparatus capable of effecting thinned-out read.

Accordingly, offset variance of OB pixel signals due to difference in the feedthrough components produced by the horizontal mixing control line signal φAV–H can be made smaller even in the second mode as shown in FIG. 2. It is thereby possible to achieve an optimum OB clamp operation even when an average value of all OB pixel signals in the horizontal direction is used. Moreover, offset variance of OB pixel signals can be further reduced by means of drive according to the drive timing chart in the second mode shown in FIG. 5 as described in the first embodiment so that more suitable OB clamp operation can be achieved even when an average value of all OB pixel signals in the horizontal direction is used.

According to the present embodiment as the above, the gate electrode of the horizontal mixing transistor M42 and M43 in the noise suppressing section is ring-shaped, and the inside of the gate electrode is made as source region, and the outside of the gate electrode as drain region. Further, the peripheral length of the gate: electrode contacting the drain region is made to be twice the peripheral length of the gate electrode contacting the source region. By then connecting the drain of the horizontal mixing transistor M42 to the holding capacitor C41, the source of the horizontal mixing transistor M42 and the source of the horizontal mixing transistor M43 to the holding capacitor C42, and the drain of the horizontal mixing transistor M43 to the holding capacitor C43, the feedthrough components by the horizontal mixing control line signal φAV–H become equal. In this manner, the potential changes ΔVFT(C41) to ΔVFT(C43) due to the various: feedthrough components occurring at the holding capacitors C41 to C43 all become the same. Accordingly, even when an average value of all OB pixel signals in the horizontal direction is used in the second mode, an optimum OB clamp operation can be achieved.

Embodiment 4

Figure 10:
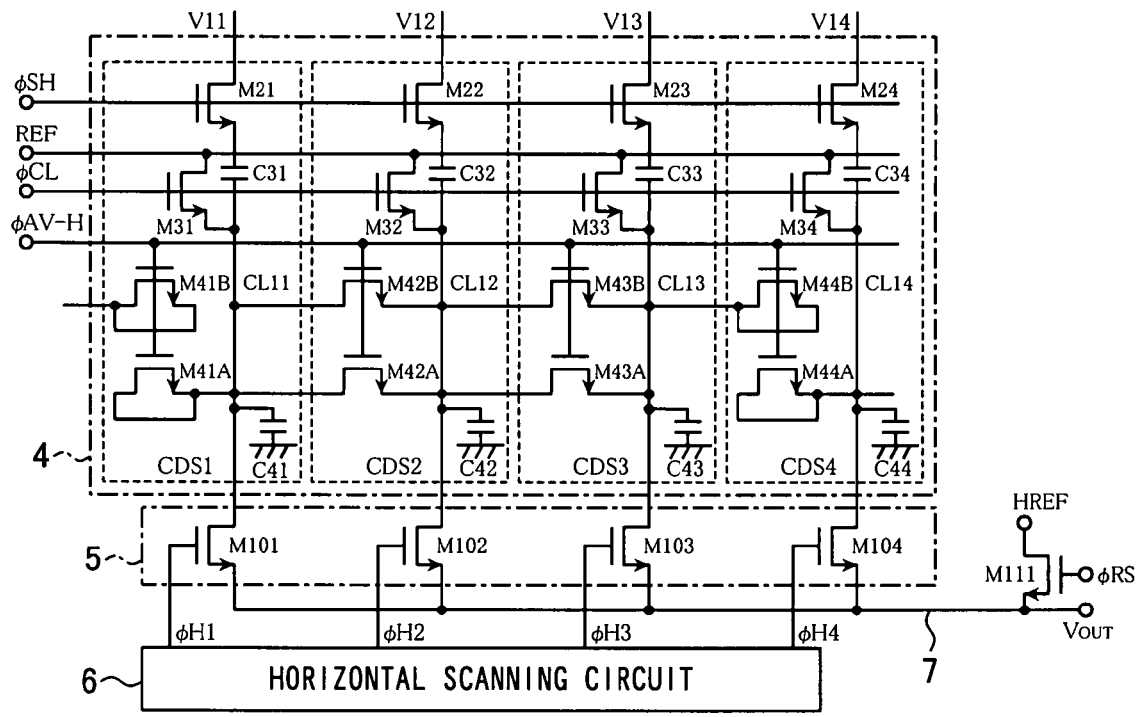
FIG. 10 is a circuit diagram showing construction of a noise suppressing section which is a main portion of the solid-state imaging apparatus according to a fourth embodiment.

A fourth embodiment of the invention will now be described. The fourth embodiment is different from the first embodiment shown in FIG. 4 only in the construction of the noise suppressing section; and the construction of the rest is similar thereto. FIG. 10 is a circuit diagram showing the noise suppressing section according to the present embodiment. At the noise suppressing section 4 according to this embodiment, the horizontal mixing transistors M42 and M43 contained therein are respectively, composed of two transistors of the same configuration M42A and M42B, and M43A and M43B. In addition, drain (or source) of dummy transistors M41B and M44A of the same configuration as the horizontal mixing transistors M42A and M42B having the gate connected to the horizontal mixing control line ϕAV–H and short-circuited source and drain is connected also to those columns where horizontal mixing is not effected (preceding stage of the first column and the fourth column in this example). Further, drain (or source) of dummy transistors M41A and M44B of the same configuration as the horizontal mixing transistors M42A and M42B having the gate connected to the horizontal mixing control line ϕAV–H and short-circuited source and drain is respectively connected to the holding capacitors of the first and third columns C41 and C43.

An operation of thus constructed noise suppressing section will now be described. Supposing that gate-source capacitance and gate-drain capacitance of the horizontal mixing transistor 42A to 43B, and dummy transistor M41A, M41B and M44A, M44B are all of the same value Cov, the connecting portions of the holding capacitors C41 to C43 are formed as indicated by the equivalent circuits in FIG. 11.

Figure 11:
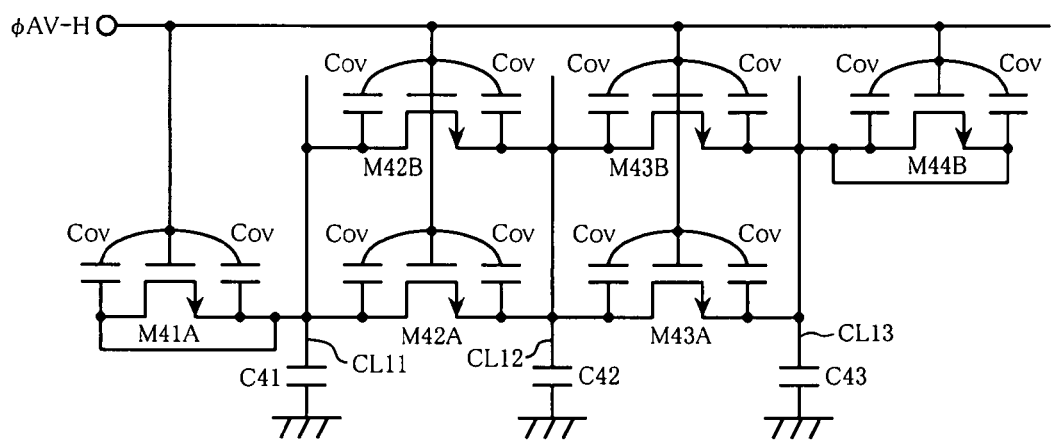
FIG. 11 shows a circuit construction of the connecting portion of holding capacitor of the noise suppressing section of the fourth embodiment shown in FIG. 10.

As shown in FIG. 11, 4×Cov is equally connected to the sampling capacitors C41 to C43. Supposing VFT(ϕAV–H) as the feedthrough component of the gate-source capacitance Cov of each horizontal mixing transistor M42A to M43B occurring by the horizontal mixing control line signal ϕAV–H, changes in potential ΔVFT(C41) to ΔVFT(C43) occurring at the holding capacitors C41 to C43 due to the feedthrough component VFT(ϕAV–H) by the horizontal mixing control line signal ϕAV–H all become the same as shown in the following expression (26).

$$\Delta VFT(C41)=\Delta VFT(C43)=\Delta VFT(C42)=4\times VFT(\phi AV-H) \quad (26)$$

Accordingly; offset variance of OB pixel signals by difference in the feedthrough components occurring due to the horizontal mixing control line signal ϕAV–H can be made smaller even when a mixing function is used. It is thereby possible to achieve an optimum OB clamp operation even when an average value of all OB pixel signals in the horizontal direction is used. Moreover, offset variance of OB pixel signals can be further reduced by using the drive timing chart at the time of horizontal mixing operation shown in FIG. 5 as described in the first embodiment so that more suitable OB clamp operation can be achieved even when an average value of all OB pixel signals in the horizontal direction is used.

In addition, supposing that the horizontal mixing transistors M42A and M42B, and M43A and M43B, and dummy transistors M41A and M41B, and M44A and M44B each are a transistor of the same configuration and same layout, since a mere change of the wiring of source and drain suffices for the dummy transistors M41A and M41B, and M44A and M44B, difference in layout pattern of each column is small so that a periodical fixed pattern is less likely to occur.

According to the present embodiment as the above, the horizontal mixing transistors M42 and M43 contained in the noise suppressing section 4 are respectively composed of two transistors of the same configuration M42A and M42B, and M43A and M43B. Then, drain (or source) of dummy transistors M41B and M44A of the same configuration as the horizontal mixing transistors M42A and M42B having the gate connected to the horizontal mixing control line ϕAV–H and short-circuited source and drain is Connected also to those columns where horizontal mixing is not effected. Further, drain (or source) of dummy transistors M41AA and M44B of the same configuration as the horizontal mixing transistors M42A and M42B having the gate connected to the horizontal mixing control line signal ϕAV–H and short-circuited source and drain is respectively connected to the holding capacitors C41 and C43. The feedthrough components thereof due to the horizontal mixing control line signal ϕAV–H thereby become equal so that the potential changes ΔVFT(C41) to ΔVFT(C43) due to the various feedthrough components occurring at the holding capacitors C41 to C43 all become the same. Accordingly, even when a mixing function is employed with using an average value of all OB pixel signals in the horizontal direction, an optimum OB clamp operation can be achieved.

It should be noted that various modifications of the circuit construction and drive method of the invention may be made without departing from the scope of appended claims.

For example, the horizontal mixing control line and sampling control line may be driven at the same timing during the horizontal mixing operation. Further the invention may be applied to the case where the number of pixels to be horizontally mixed is not three columns or to a mixing between pixels not adjacent to each other such as the horizontal mixing of "a" column and "n+2" column or mixing of "m" row and "m+2" row. In addition, even when components and drive method of the unit pixel are changed, it suffices to change the circuit construction or drive method of the vertical scanning circuit or noise suppressing section.

As has been described by way of the above embodiments, according to the first aspect of the invention, the mixing switch is turned OFF by the mode control section to cause the noise suppressing section to execute noise suppression of pixels when the first mode is set, and when the second mode is set, the mixing switch is turned ON after turning OFF the clamp signal so that the noise suppressing section is caused to execute noise suppression of pixels while mixing signals of the pixels. The remaining of feedthrough components of the mixing switch at the setting of the second mode is thereby suppressed so that favorable signals associated with OB pixels can be obtained.

According to the second aspect, when noise suppressing operation and the horizontal mixing operation of a plurality of pixel signals are simultaneously effected with using the second mode, since offset components due to the mixing switch are canceled each other at the timings of ON and OFF of the mixing switch, a periodical offset component of the OB pixel output can be suppressed. It is thereby possible to achieve an optimum OB clamp operation even when a horizontal mixing operation is effected.

According to the third aspect, since offset components due to the mixing switch are of the same value when noise suppressing operation and the horizontal mixing operation of a plurality of pixel signals are simultaneously effected with using the second mode, a periodical offset component of the OB pixel output can be suppressed. It is thereby possible to achieve an optimum OB clamp operation even when a horizontal mixing operation is effected.

According to the fourth aspect, since offset components due to the mixing switch become the same value when noise suppressing operation and the horizontal mixing operation of a plurality of pixel signals are simultaneously effected with using the second mode, a periodical offset component of the OB pixel output can be suppressed so that an optimum OB clamp operation can be achieved even when a horizontal mixing operation is effected. In addition, the switching MOS transistor and the dummy switching MOS transistor are formed of transistors of the same configuration and same layout so that a mere change in the wiring suffices. The difference in layout pattern from one column to another is thereby reduced so that a periodical fixed pattern is less likely to occur.

According to the fifth aspect, since offset components due to the mixing switch are of the same value when noise suppressing operation and the horizontal mixing operation of a plurality of pixel signals are simultaneously effected with using the second mode, a periodical offset component of the OB pixel output can be suppressed. It is thereby possible to achieve an optimum OB clamp operation even when a horizontal mixing operation is effected.

According to the sixth aspect, since offset components due to the mixing switch become the same value when noise suppressing operation and the horizontal mixing operation of a plurality of pixel signals are simultaneously effected with using the second mode, a periodical offset component of the OB pixel output can be suppressed to thereby achieve an optimum OB clamp operation even when a horizontal mixing operation is effected. In addition, the switching MOS transistor and the dummy switching MOS transistor are formed of transistors of the same configuration and same layout so that a mere change in the wiring suffices. The difference in layout pattern from one column to another is thereby reduced so that a periodical fixed pattern is less likely to occur.

What is claimed is:

1. A solid-state imaging apparatus comprising:
a pixel section having a plurality of pixels two-dimensionally arranged in rows and columns, each including a photoelectric conversion section and an amplification section for amplifying and outputting as pixel signal an output of said photoelectric conversion section;
a vertical scanning section for selecting a row to be read out of said pixel section;
a noise suppressing section comprising clamp capacitors each connected at one end thereof to output ends of said pixels by the unit of said column of said pixel section and a mixing switch for mixing signals of a plurality of pixels in said row direction by connecting the other ends of adjacent ones of said clamp capacitors, setting as a reference level a signal level of said pixel retained at said clamp capacitor at a first timing when a clamp setting signal for setting a clamp potential is being applied to the other end of said clamp capacitor, for obtaining an output signal corresponding to a difference level therefrom of a signal level associated with said pixel at a second timing so as to effect noise suppression of signal associated with said pixel;
a horizontal scanning section for sequentially selecting by the unit of said column those signals associated with said pixels after said noise suppression and outputting them from a horizontal signal line; and
a mode control section having in a selective manner a first mode where said noise suppressing section is caused to execute said noise suppression with said mixing switch turned OFF, and a second mode where said noise suppressing section is caused to execute said noise suppression with said mixing switch turned ON after a turning OFF of said clamp setting signal, said mixing switch is turned OFF before reading signal out to the horizontal output line from said noise suppressing section in order to have the noise generated by feedthrough components to cancel each other.

2. The solid-state imaging apparatus according to claim 1, wherein said noise suppressing section further comprises an amplification section for outputting an inversion amplification signal or a non-inversion amplification signal of the output signal corresponding to said difference level.

3. The solid-state imaging apparatus according to claim 1, wherein said mixing switch is formed of MOS transistor where drain configuration and source configuration are set in accordance with a number and location of the connected ones of said clamp capacitors so that width of the gate thereof connected to each one of said clamp capacitors is substantially the same between each of the clamp capacitors.

4. The solid-state imaging apparatus according to claim 1, wherein said mixing switch is formed in units each with an even number of first MOS transistors of the same configuration connected in parallel to one another disposed between the other ends of adjacent ones of said clamp capacitors, and having second MOS transistors functioning as switches for said first MOS transistors and equal in number to half the number of said first MOS transistors, having the same configuration as said first MOS transistor with the source and drain thereof being connected to the other ends of said clamp capacitors that are located at both ends in an arrangement of said clamp capacitors to be mixed.

5. A solid-state imaging apparatus comprising:
a pixel section having a plurality of pixels two-dimensionally arranged in rows and columns, each including a photoelectric conversion section and an amplification section for amplifying and outputting as pixel signal an output of said photoelectric conversion section;
a vertical scanning section for selecting a row to be read out of said pixel section;
a noise suppressing section comprising clamp capacitors each connected at one end thereof to output ends of said pixels by the unit of said column of said pixel section and a mixing switch for mixing signals of a plurality of pixels in said row direction by connecting the other ends of adjacent ones of said clamp capacitors, setting as a reference level a signal level of said pixel retained at said clamp capacitor at a first timing when a clamp setting signal for setting a clamp potential is being applied to the other end of said clamp capacitor, for obtaining an output signal corresponding to a difference level therefrom of a signal level associated with said pixel at a second timing so as to effect noise suppression of signal associated with said pixel;
a horizontal scanning section for sequentially selecting by the unit of said column those signals associated with said pixels after said noise suppression and outputting them from a horizontal signal line; and
a mode control section having in a selective manner a first mode where said noise suppressing section is caused to execute said noise suppression with said mixing switch turned OFF, and a second mode where said noise suppressing section is caused to execute said noise suppression with said mixing switch turned ON, said mixing switch is turned OFF before reading signal out to the horizontal output line from said noise suppressing section in order to have the noise generated by feedthrough components to cancel each other;
wherein said mixing switch is formed of MOS transistors where drain configuration and source configuration are set in accordance with a number and location of the connected ones of said clamp capacitors so that width of the gate thereof connected to each one of said clamp capacitors is substantially the same between each of the clamp capacitors.

6. A solid-state imaging apparatus comprising:

a pixel section having a plurality of pixels two-dimensionally arranged in rows and columns, each including a photoelectric conversion section and an amplification section for amplifying and outputting as pixel signal an output of said photoelectric conversion section;

a vertical scanning section for selecting a row to be read out of said pixel section;

a noise suppressing section comprising clamp capacitors each connected at one end thereof to output ends of said pixels by the unit of said column of said pixel section and a mixing switch for mixing signals of a plurality of pixels in said row direction by connecting the other ends of adjacent ones of said clamp capacitors, setting as a reference level a signal level of said pixel retained at said clamp capacitor at a first timing when a clamp setting signal for setting a clamp potential is being applied to the other end of said clamp capacitor, for obtaining an output signal corresponding to a difference level therefrom of a signal level associated with said pixel at a second timing so as to effect noise suppression of signal associated with said pixel;

a horizontal scanning section for sequentially selecting by the unit of said column those signals associated with said pixels after said noise suppression and outputting them from a horizontal signal line; and a mode control section having in a selective manner a first mode where said noise suppressing section is caused to execute said noise suppression with said mixing switch turned OFF, and a second mode where said noise suppressing section is caused to execute said noise suppression with said mixing switch turned ON;

wherein said mixing switch is formed in units each with an even number of first MOS transistors of the same configuration connected in parallel to one another disposed between the other ends of adjacent ones of said clamp capacitors, and having second MOS transistors functioning as switches for said first MOS transistors and equal in number to half the number of said first MOS transistors, having the same configuration as said first MOS transistor with the source and drain thereof being connected to the other ends of said clamp capacitors that are located at both ends in an arrangement of said clamp capacitors to be mixed.

* * * * *